(12) United States Patent
Wolkerstorfer et al.

(10) Patent No.: US 8,474,596 B2
(45) Date of Patent: Jul. 2, 2013

(54) TRANSFER CONVEYING APPARATUS

(71) Applicant: TGW Mechanics GmbH, Wels (AT)

(72) Inventors: Christoph Wolkerstorfer, Wels (AT);
Markus Wolkerstorfer,
Niederwaldkirchen (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 13/741,641

(22) Filed: Jan. 15, 2013

(65) Prior Publication Data

US 2013/0126300 A1 May 23, 2013

Related U.S. Application Data

(63) Continuation of application No. PCT/AT2011/000304, filed on Jul. 15, 2011.

(30) Foreign Application Priority Data

Jul. 16, 2010 (AT) .............................. A 1211/2010

(51) Int. Cl.
*B65G 47/46* (2006.01)

(52) U.S. Cl.
USPC .................................. 198/370.09; 198/371.3

(58) Field of Classification Search
USPC .................. 198/370.02, 370.09, 370.1, 371.3
See application file for complete search history.

(56) References Cited

U.S. PATENT DOCUMENTS

| | | | |
|---|---|---|---|
| 3,219,166 A * | 11/1965 | Collins et al. | 198/370.04 |
| 3,983,988 A * | 10/1976 | Maxted et al. | 198/370.09 |
| 4,598,815 A | 7/1986 | Adama | |
| 4,746,003 A * | 5/1988 | Yu et al. | 198/367 |
| 4,792,034 A * | 12/1988 | Leemkuil | 198/370.09 |
| 5,029,693 A * | 7/1991 | Williams | 198/370.09 |
| 5,086,906 A * | 2/1992 | Ludke | 198/369.5 |
| 5,117,961 A * | 6/1992 | Nicholson | 198/369.5 |
| 5,145,049 A | 9/1992 | McClurkin | |
| 5,480,022 A * | 1/1996 | Matsuda et al. | 198/782 |

(Continued)

FOREIGN PATENT DOCUMENTS

| DE | 24 23 138 | 11/1975 |
|---|---|---|
| DE | 20 2005 015 544 | 3/2007 |

(Continued)

OTHER PUBLICATIONS

International Search Report of PCT/AT2011/000304 dated Dec. 6, 2011.

*Primary Examiner* — James R Bidwell
(74) *Attorney, Agent, or Firm* — Collard & Roe, P.C.

(57) ABSTRACT

The invention describes a transfer conveying apparatus (1) having small conveying rollers (14) which form a conveying plane (13) for an item of transported goods (3) for a main conveying direction and at least one auxiliary conveying direction with a pivoting apparatus for pivoting the small conveying rollers (14) about pivot axes which extend perpendicularly with respect to the conveying plane (13) and with a drive apparatus for the small conveying rollers (14). A load-bearing frame of the transfer conveying apparatus (1) having at least one row (11) of the small conveying rollers (14) arranged transversely with respect to the main conveying direction and having pivoting transfer and drive transfer for the row (11) of the small conveying rollers (14) forms a conveying module which is connected detachably to a base module having at least one pivoting drive arrangement and at least one small-roller drive arrangement.

16 Claims, 9 Drawing Sheets

U.S. PATENT DOCUMENTS

| | | | |
|---|---|---|---|
| 5,921,374 A | 7/1999 | Takino et al. | |
| 5,971,133 A * | 10/1999 | Wilkins | 198/370.09 |
| 6,179,113 B1 | 1/2001 | Wünscher et al. | |
| 6,619,465 B1 * | 9/2003 | Gebhardt | 198/370.09 |
| 7,040,478 B2 * | 5/2006 | Ehlert | 198/370.09 |
| 7,681,710 B2 | 3/2010 | Kuhn et al. | |
| 2003/0234155 A1 | 12/2003 | Kanamori et al. | |
| 2005/0040009 A1 | 2/2005 | Ehlert | |

FOREIGN PATENT DOCUMENTS

| | | |
|---|---|---|
| EP | 0 956 249 | 11/1999 |
| EP | 1 323 647 | 7/2003 |
| EP | 1 375 389 | 1/2004 |
| FR | 2 852 940 | 10/2004 |
| JP | 59-31211 | 2/1984 |
| JP | 2-13509 | 1/1990 |
| WO | WO 98/50297 | 11/1998 |

* cited by examiner

TRANSFER CONVEYING APPARATUS

CROSS REFERENCE TO RELATED APPLICATIONS

Applicant claims priority under 35 U.S.C. §119 of Austrian Application No. A 1211/2010 filed on Jul. 16, 2010. This application is also a continuation of and Applicant claims priority under 35 U.S.C. §120 of International Application No. PCT/AT2011/000304 filed on Jul. 15, 2011, which claims priority under 35 U.S.C. 119 of Austrian Application No. A 1211/2010 filed on Jul. 16, 2010. The international application under PCT article 21(2) was not published in English. The disclosure of the aforesaid International Application and Austrian application are incorporated by reference.

The invention relates to a transfer conveying apparatus having a conveying module, a base module, small conveying rollers which form a conveying plane for an item of transported goods in a main conveying direction or in an auxiliary conveying direction, a pivoting drive arrangement and a pivoting transfer means for pivoting the small conveying rollers about pivot axes which extend perpendicularly with respect to the conveying plane and a small-roller drive arrangement and a drive transfer means for driving the small conveying rollers, and by means of a bearing pin, each small conveying roller is mounted between bearing legs of a carrier for small rollers which carrier can be pivoted about the pivot axis and can be rotated about a rotary axis extending perpendicularly with respect to the pivot axis and the conveying module is detachably connected to the base module, which base module comprises the pivoting drive arrangement and the small-roller drive arrangement and the conveying module forms a load-bearing frame, at least one row of small conveying rollers being arranged perpendicularly with respect to the main conveying direction, the pivoting transfer means for pivoting the small conveying rollers in this row and the drive transfer means for driving the small conveying rollers in this row, with the load-bearing frame comprising front plates which are arranged between the lateral legs of the base module and are detachably connected to said lateral legs as well as a support bar which extends between the latter.

Documents JP 59 031211 A, EP 1 375 389 A1, U.S. Pat. No. 4,598,815 A, EP 1 323 647 A1, U.S. Pat. No. 5,145,049 A, DE 24 23 138 A1, DE 20 2005 015 544 U1, U.S. Pat. No. 5,971,133 A, FR 2 852 940 A1 and US 2005/0040009 A1 discloses a transfer conveying apparatus having a conveying module, a base module, small conveying roller forming a conveying plane for transporting items of transported goods in a main conveying direction or an auxiliary direction, at least one pivoting drive arrangement and one pivoting transfer means for pivoting the small conveying rollers about pivoting axes extending perpendicularly with respect to conveying plane and at least one small-roller drive arrangement and one drive transfer means for driving the small conveying rollers, with each of the small conveying rollers being mounted to a carrier for small rollers which carrier can be rotated around the pivot axis and with the conveying module being detachably connected to the base module, which base module comprises the pivoting drive arrangement and the small-roller drive arrangement.

Document BP 0 956 249 B1 discloses a transfer conveying apparatus having conveying rollers forming a conveying plane for transporting items of transported goods in a main conveying direction or an auxiliary conveying direction, at least one pivoting drive arrangement and one pivoting transfer means for pivoting the conveying rollers about pivot axis extending perpendicularly with respect to the conveying plane and at least one roller drive arrangement and one drive transfer means for driving the conveying roller, with each of the conveying rollers being mounted to a roller carrier that can be rotated around the pivot axis. The roller drive arrangement (drive roller 24) and pivoting drive arrangement (cylinder 32) are mounted to the frame of the conveyor arrangement and thus being arranged at the base module. Each of the two pivotable conveying rollers in one row is coupled to the drive roller associated to that row by means of an own drive transfer means (driving belt 26).

Document U.S. Pat. No. 3,983,988 A describes a transfer conveying apparatus having small conveying rollers which form a conveying plane and can be pivoted about pivot axis extending perpendicularly with respect to the conveying plane for conveying items of goods to be transported in a main conveying direction and the gating-in and gating-out in auxiliary directions. For conveying in main conveying direction, this transfer conveying apparatus has transport rollers being driven in a frame. Rows of small conveying rollers being spread over a conveying width, are collectively driven and can be pivoted about a pivot axis extending perpendicularly with respect to a conveying plane are arranged between them, with each row being associated to a pivoting drive.

A further document, U.S. Pat. No. 7,681,710 B2 describes a transfer conveying apparatus having conveying rollers that are collectively driven and form a conveying plane for items of goods to be transported for a main conveying track. In a region of gating-in and gating-out for the items of goods to be transported from and to, respectively, an auxiliary conveying track, belt conveying modules are detachably arranged in an enlarged intermediate space of the conveying rollers in a support frame and said modules can be frictionally engaged with a common drive shaft and are driven at a conveying direction running perpendicularly with respect to the main conveying track. Together with the belt conveying modules and the drive shaft, the support frame is arranged in the base frame of the transfer conveyor as to be adjustable in perpendicular direction with respect to the conveying plane of the conveying rollers.

The objective of the invention is to create a transfer conveying apparatus as a unit with variable conveying direction which unit can be integrated into a conveying system for items to be transported and is formed from modules simplifying the amount of maintenance required.

Said objective of the invention is achieved by the support bar being provided with bores and therein arranged bearing bushings, each for a tube-shaped bearing extension being mounted at the carrier for small rollers in a pivoting manner, with the bearing extension of each carrier for small rollers protruding from bearing bushing at a lower side and at its protruding end region being provided with a toothed ring and by the toothed rings in this row being drive-connected to one another by means of a toothed belt which is guided around the latter so that the pivoting transfer means having the toothed rings and the toothed belt are arranged along the lower side of the support bar and by the toothed belt is coupled to a drive member having the pivoting drive arrangement by means of a belt connector. The advantage is that the fact that the conveying module having the pivoting small conveying rollers is structurally divided into a conveying module and a drive module at a uniform concept allows a number of combination options designed to meet users' specifications of drive systems of conveying units of a conveying system and the amount of maintenance and repair required is simplified. The pivoting transfer means has a simple design, the number of means required for pivoting the small conveying rollers or carrier for small rollers is low, so that a compact design is achieved for the conveying module. A low-wear long-term usage is likewise possible.

A safe transmission of the driving force required for conveying the items of good to be trans-ported can be achieved if the conveying plane formed by the small conveying rollers extends slightly above a conveying plane of adjacent conveyors of the conveying system, e.g. roller conveyors, belt conveyors, chain conveyors.

The conveying module and the base module can have cooperating, gate-shaped centering means and connecting means, with the result that it is possible for short access times to the individual components of the conveying module to be achieved and times of nonuse due to maintenance and repair of the conveying system are noticeably reduced and expenses are saved, thus.

It is advantageous if the conveying module has a plurality of parallel rows of small conveying rollers which rows are arranged at low distances to each other and extend across a conveying width, since therefore the effort in terms of manufacturing and assembly is reduced.

If the rows are assigned to a common small-roller drive arrangement that may be coupled to the drive transfer means in the base module, the number of drive-connections is reduced and drive means are saved.

According to an embodiment of the invention it is provided that a common pivoting drive arrangement that may be coupled to the pivoting transfer means in the base module is assigned to the rows. This being the case, a grouping of rows is achieved, which rows can be collectively pivoted by only one pivoting drive arrangement and by the identical angle value. Furthermore, the number of rows arranged in the conveying module can be adapted depending on the transport requirements.

The pivoting drive arrangement is formed by a linear adjustment drive. The linear adjustment drive is an actuator that can be charged with a pressurizing medium and that has a center position as well as two opposite end positions, such as a double-acting cylinder arrangement. Using said arrangement, it is allowed for the angle settings to be given exactly. Furthermore, these components are technically sophisticated and perfectly suitable for a high number of switching cycles.

Possible is an embodiment, whereby a transmission of an adjustment way between end positions of the linear adjustment drive is designed for a pivot angle of the small conveying rollers about the pivot axis to be approximately 180°. Thus, a variable design of pivot angles is achieved and it is possible for the processes of gating-in and gating-out for the items of goods to be transported to be optimized depending on the transport specifications and the design of the entire conveying system.

If at least one respective driven conveying roller is arranged between respectively adjacent rows of small conveying rollers extending across the entire conveying width, it is possible to achieve further variants concerning the process of transfer.

It is advantageous if the drive transfer means comprises a drive shaft which extends between the front plates of the load-bearing frame at a lower side of the support bar and is arranged at the front plates. A rotary axis of the drive shaft and the pivot axes of the small conveying rollers in the row extend in a common plane. Thereby, a uniform design is achieved for the conveying modules having only one or also several rows of small conveying rollers.

It has also turned out to be advantageous if the drive shaft comprises annular constrictions which are assigned to the respective pivot axes of the carrier for small rollers and the small conveying rollers are designed to be small tandem rollers having two raceways each and have an annularly designed groove between the raceways, with the small tandem rollers being coupled to the drive shaft by means of endless string-like transmission means respectively running in the grooves and the constrictions. In this way, an exact centering of a transmission means for driving the small conveying rollers with respect to the pivot axis is achieved. It can furthermore be advantageous if the raceways of the small conveying rollers are provided with a coating having a high friction value, e.g. of polyurethane, or a positive-locking structure, e.g. a bordered surface.

According to an embodiment of the invention it is provided that the conveying module comprises a transmission roller and the drive transfer means comprises the drive shaft, with the transmission roller being rotatably arranged in a coupling housing arranged at the conveying module and being coupled to the drive shaft by means of a circumferentially running belt and the base module comprising the small-roller drive arrangement and a disc drive, with the disc drive being rotatably mounted in a coupling housing arranged at the base module and the transmission roller being detachably drive-connected to a disc drive by means of a mechanical coupling. In this way, a quick detachment of the drive-connection of the small-roller drive between the components of the base module and the conveying module for purposes of maintenance and repair is achieved.

It is furthermore of advantage if the disc drive is drive-connected to a coupling pin which is mounted in the coupling housing so as to be adjustable in axial direction. This being the case, the coupling pin and the drive shaft can be connected by means of a claw coupling on the end wall side. The coupling pin can furthermore be pre-stressed by means of a spring arrangement in engaged position of the claw coupling. This being the case, a high degree of safety for a trouble-free transmission of the driving torque for the small-roller drive arrangement is given.

It is furthermore advantageous if the conveying module comprises a transmission roller, with the transmission roller being rotatably mounted in a coupling housing being arranged at the conveying module and being coupled to the drive shaft by means of a circumferentially running belt, and the base module comprises an electric motor, with the transmission roller being detachably drive-connected to the electric motor. In this way, it is possible for different drive solutions adjustable to the respective conveying system to be designed in combination with roller conveyor drives, belt drives, individual drives.

It is also advantageous if the small conveying roller is a small tandem roller having two raceways with a groove being annularly embodied between the raceways and if a covering element is arranged at the carrier for small rollers, which covering element is provided with apertures for a protrusion of a portion of the raceways of the small tandem rollers. The covering element can be pivoted together with the carrier for small rollers. In this way and in combination with a cover plate, a tight coverage of the transfer conveying apparatus is achieved and malfunctions caused by pollution is avoided to the greatest possible extent.

It is possible for the transfer conveying apparatus to be very easily integrated as a unit into a conveying systems for items of goods to be transported. It is also advantageous if a disc drive of the transfer conveying apparatus is drive-connected to the driven conveyors, e.g. belt conveyors, roller conveyors arranged ahead and subsequently by means of a belt arrangement.

For a better understanding of the invention the latter is explained in more detail with reference to the following Figures.

In a much simplified representation.

First of all, it should be noted that in the variously described exemplary embodiments the same parts have been given the same reference numerals and the same component names, whereby the disclosures contained throughout the entire description can be ap-plied to the same parts with the same reference numerals and same component names. Also details relating to position used in the description, such as e.g. top, bottom, side etc. relate to the currently described and represented figure and in case of a change in position should be adjusted to the new position.

All of the details relating to value ranges in the present description are defined such that the latter include any and all part ranges, e.g. a range of 1 to 10 means that all part ranges, starting from the lower limit of 1 to the upper limit 10 are included, i.e., the whole part range beginning with a lower limit of 1 or above and ending at an upper limit of 10 or less, e.g. 1 to 1.7, or 3.2 to 8.1 or 5.5 to 10.

Figure 1:
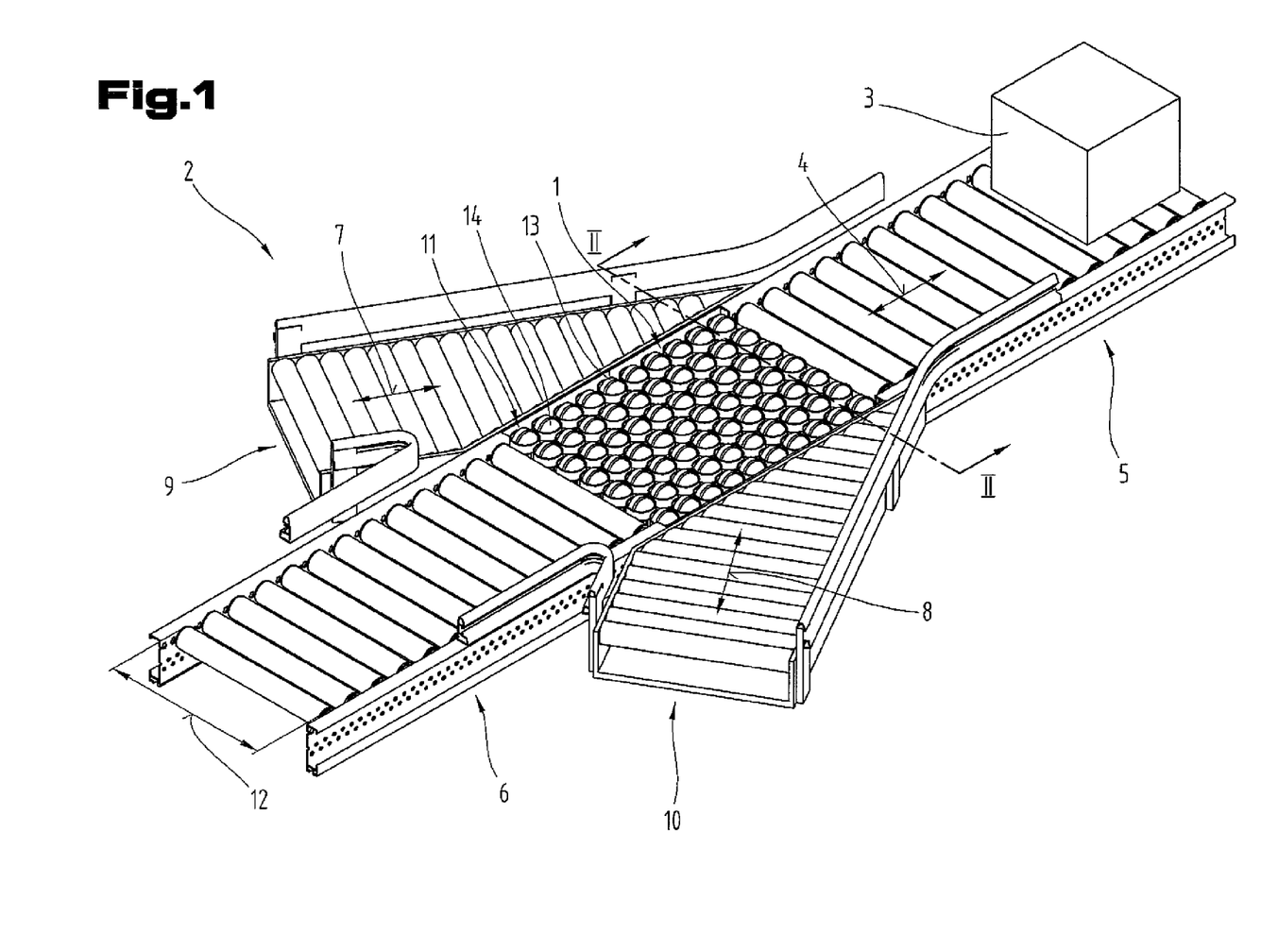
FIG. 1 shows a conveying system having transfer conveying apparatus proposed by the invention in schematic view.

FIG. 1 shows a transfer conveying device 1 of a branched conveying system 2 for items of goods to be transported 3. The exemplarily shown conveying system 2 is formed by roller conveyors 5, 6 forming a main conveying track—according to double arrow 4—with the transfer conveying apparatus 1 being arranged between the roller conveyors 5, 6, and two roller track gates 9, 10 branching off from the region of the transfer conveying apparatus 1 at an angle and forming auxiliary conveying tracks.

Naturally, it is possible to use other conveyors, e.g. small roller, band, belt or chain conveyors instead of the shown roller conveyors 5, 6 and/or roller track gates 9, 10 for the main and auxiliary conveying tracks.

The transfer conveying apparatus 1 is formed from several rows of small conveying rollers 14 which are spread across a conveying width 12 and embody a conveying plane 13 for the items of goods to be transported 3. The small conveying rollers of each row 11 are driven collectively and can be pivoted about pivot axes which are aligned perpendicularly to the conveying plane 11 and, depending on the pivot position, guide the items of goods to be transported 3 along the main conveying track or between the latter and the auxiliary conveying track via the conveying system 2.

Depending on the layout of the conveying direction of the shown conveying system 2, the transport conveying apparatus 1 is suitable for gating-out the items of goods to be transported 3 out of the main conveying track—according to double arrow 4—into the auxiliary conveying tracks—according to double arrows 7, 8 or, in the event of reverse conveying direction, for a gating-in the items of goods to be transported 3 out of the auxiliary conveying tracks—according to double arrows 7, 8 into the main conveying track—according to double arrow 4. It is not required to describe further detailed embodiments as known for a conveying system 2 of this kind, such as support constructions, drives, conducting devices etc., since they are known from prior art in numerous, different embodiments.

Figure 2:
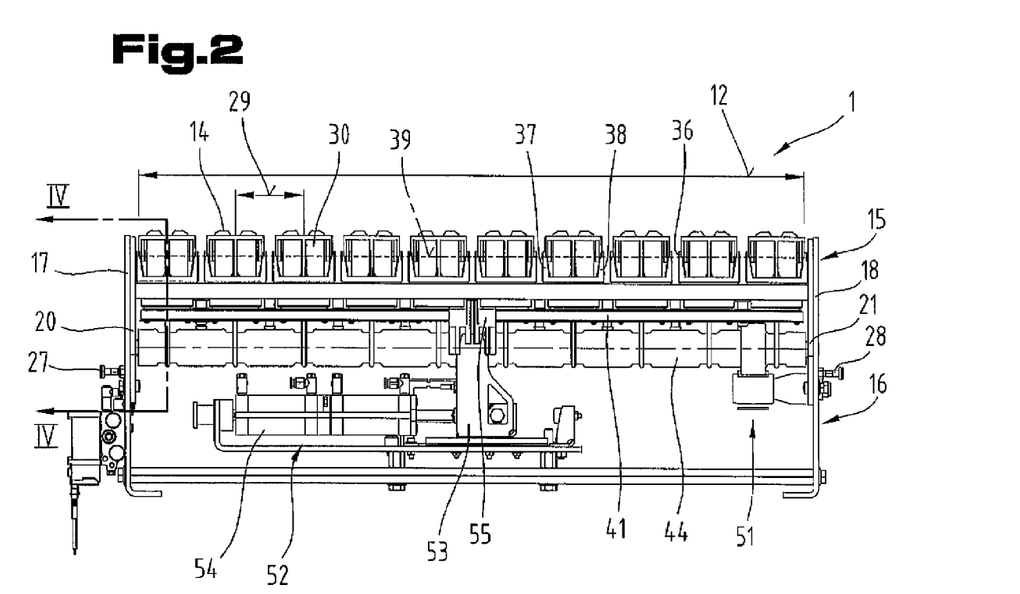
FIG. 2 shows the transfer conveying apparatus in sectional view according to the lines II-II in FIG. 1; transfer conveying apparatus.
Figure 3:
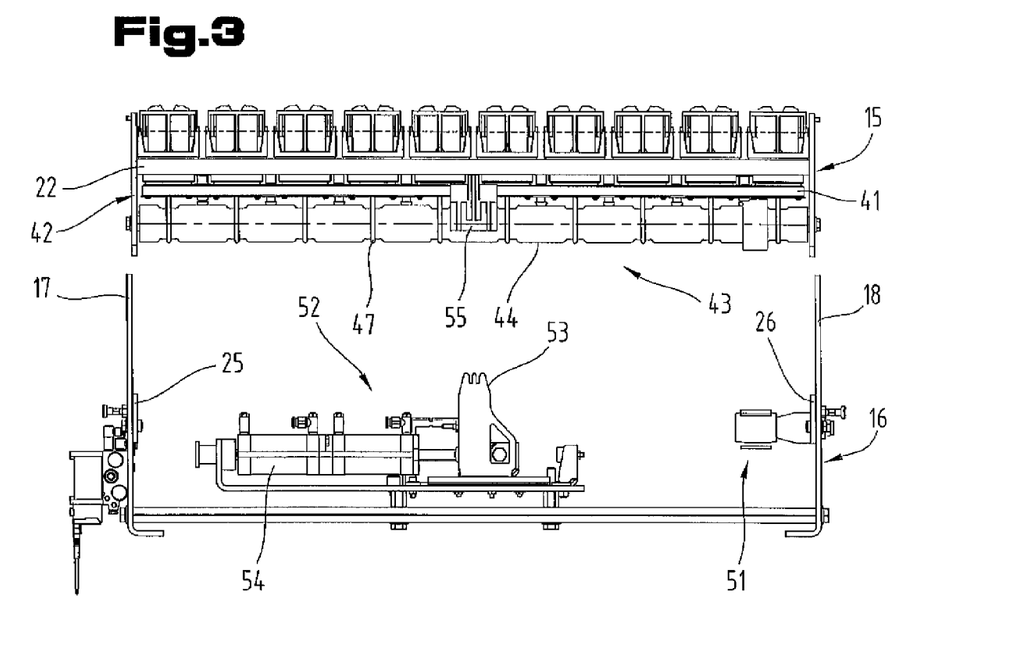
FIG. 3 shows the transfer conveying apparatus according to FIG. 2 with the components conveying module and base module in decoupled state.
Figure 4:
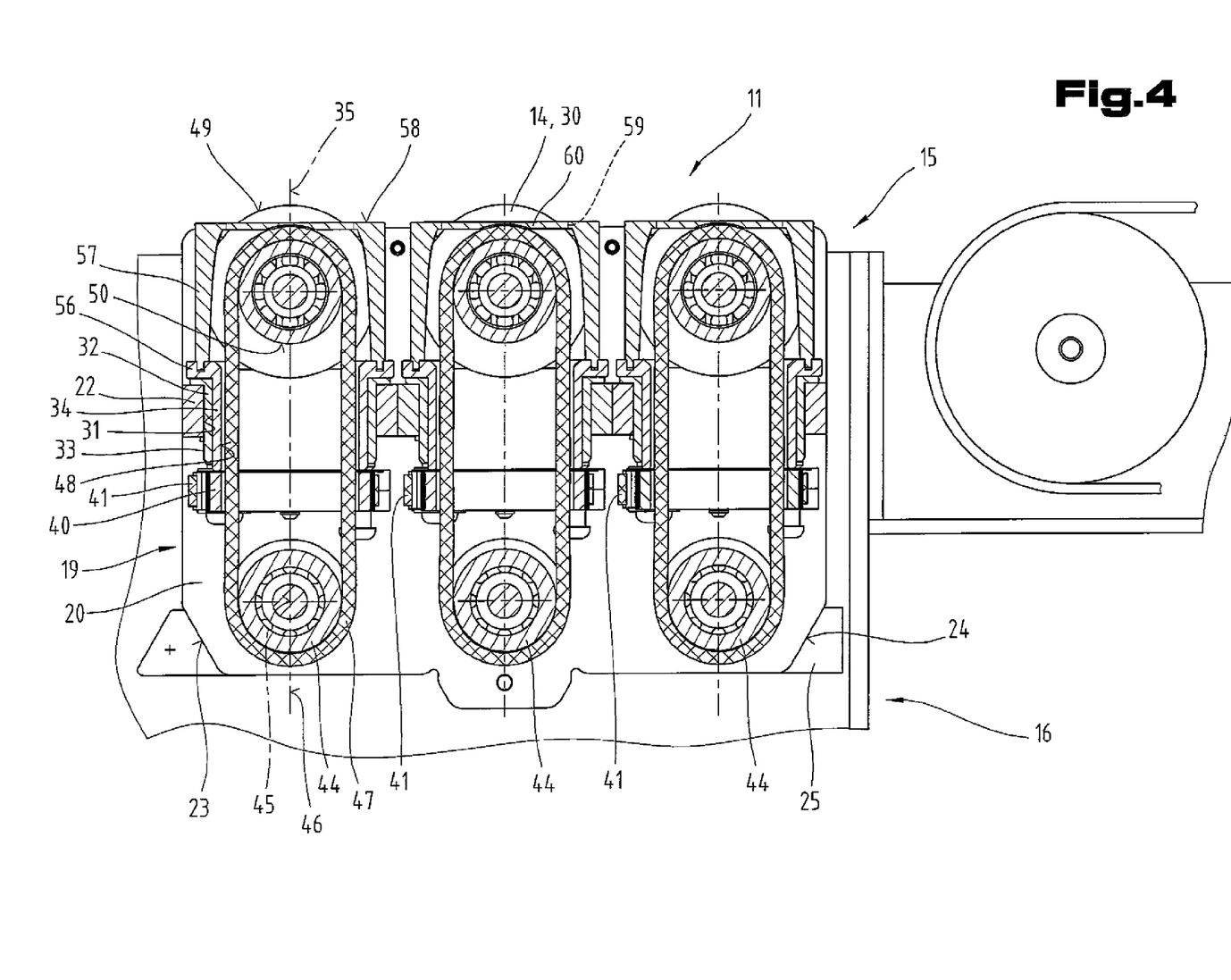
FIG. 4 shows a detail section of the transfer conveying apparatus in section according to the lines IV-IV in FIG. 2.

FIGS. 2 to 4 show the transfer conveying apparatus 1 according to the invention, including a conveying module 15 and a base module 16, which form separated units that can be coupled.

The base module 16 is formed from a tub-shaped sheet metal construction and has lateral legs 17, 18 spaced apart from each other at the distance of the conveying width 12, between which lateral legs 17, 18 the conveying module 15 is held.

In the embodiment shown, the conveying module 15 is made of three of the rows 11 of the small conveying rollers 14, which are combined as a row group in a load-bearing frame 19. The load-bearing frame 19 includes two front plates 20, 21, which can be positioned between the lateral legs 17, 18 and can be coupled to the latter, as well as a support bar 22, which extends between the latter and accommodates one respective row 11 of the small conveying rollers 14.

The load-bearing frame 19 is positioned between the lateral legs 17, 18 by means of positioning surfaces 23, 24 of the front plates 20, 21 extending to one another at an angle and by means of positioning guides 25, 26 being arranged at the lateral legs 17, 18.

The load-bearing frame 19 is detachably connected to the lateral legs 17, 18 by means of fastening means 27, 28, e.g. screws, bolts, locking bars etc.

Once the fastening means 27, 28 have been detached, the conveying module 15, in the exemplary embodiment having three rows 11 of small conveying rollers 14, can be removed from or inserted again into the base module 16 entirely in upward direction—as shown in FIG. 3, if required, e.g. for purposes of maintenance and repair, without making necessary any further intervention into the conveying system.

The grouping of several rows 11 to be the conveying module 15 should only be understand as an example and it is absolutely possible for the conveying module 15 to have only one row 11 with the small conveying rollers 14 but also a group of more than three of the rows 11.

Taking into account one of the rows 11 of the conveying module 15, according to FIGS. 3 and 4, this is on the one hand made from the support bar 22 extending between the front plates 20, 21 and small conveying rollers 14 arranged across the conveying width 12 at a medium distance 29, which small conveying rollers are embodied to be small tandem rollers 30. The support bar 22 is provided with bores 31, in which bores 31 bearing bushings 32 as friction bearings are arranged and in which small conveying rollers 14 are mounted to be able to pivot about a pivot axis 35 extending perpendicularly with respect to the conveying plane 13 by means of a tube-shaped bearing extension 33.

By means of bearing pins 36, the small tandem rollers 30 are arranged between lateral legs 37, 38 of the carrier for small rollers 34 and mounted to be able to rotate around a rotary axis 39 being aligned perpendicularly with respect to the pivot axis 35. The bearing extension 33 projects through the bearing bushing 32 and a toothed ring 40 is attached to the protruding end region of the bearing extension 33.

A drive-connection of any toothed rings 40 of the row 11 is created by means of a toothed belt 41 guided above the toothed rings 40 and thus, a collective pivoting process of all carriers for small rollers 34 and consequently a pivoting transfer means 42 extending along the lower side of the support bar 22 is achieved, when the toothed belt 41 is adjusted.

Furthermore, the conveying module 15 has a drive transfer means 43. This is formed from a drive shaft 44 which extends below the toothed belt drive between the front plates 20, 21 and is mounted to be able to rotate in bearing arrangements. A rotary axis 45 of the drive shaft 44 extends in a plane 46 stretching between the pivot axes 35 of the row 11.

In the region of the pivot axes 35, the drive shaft 44 has annular constrictions and the small tandem rollers 30 are driven by means of endless, string-like transmission means 47 that are guided through a bore 48 of the tube-shaped bearing extension 33 of the carrier for small rollers 34 by means of the drive shaft 44 and guided via a circumferentially extending annular groove 50 embodied between two raceways 49 of the small tandem rollers 30.

Due to the flexibility of the transmission means 47 it is possible to pivot the small conveying roller 14 about the pivot axes 35 starting at a middle position to nearly +/−90°, with the result that the conveying strings of the transmission means 47 cross.

The drive shaft 44 being arranged and mounted in the conveying module 15 and the transmission means 47 consequently form the drive transfer means 43 of the conveying module 15.

The drive shaft 44 is driven by means of a small-roller drive arrangement 51 of the base module 16, for which purpose several embodiments are existent, as it will be explained below in more detail.

Additionally, at least one pivoting drive arrangement 52 for a linear adjustment of a drive member 53 being engaged with the toothed belt 41 of the conveying module 15 is arranged in the base module 16, which drive member 53 in the exemplary embodiment is formed from a linear adjustment drive 54 to which a pressure medium can be applied. Preferably, the drive member 53 can be latched into a belt connector 55 and is connected to the endless toothed belt 41.

By means of this linear adjustment drive 54, which will be explained in more detail below, and the connectable drive-connection with the toothed belt 41, a collective pivoting of any small conveying rollers 14 of at least one row 11 is executed when the drive member 53 is adjusted.

The structural separation between the conveying module 15 with the pivoting transfer means 42, the small conveying rollers 14, the drive shaft 44, the drive transfer means 43 and the base module 16 with the small-rollers drive arrangement 51, the pivoting drive arrangement 52, the drive member 53 allows the conveying module 15 to be detached from the base module 16 entirely without requiring assembly.

Thus, a simplified maintenance or, if required, a simple exchange of component parts is achieved, with the drive-connection for pivoting the small conveying rollers 14 and for driving the drive shaft 44 being achieved automatically without further measures or when the conveying module 15 is being inserted into the base module 16.

As it can be furthermore seen in FIG. 4, according to a possible embodiment, a flange 56 is embodied at the carrier for small rollers 34 and a covering element 57 which is lifted in the direction of the conveying plane formed from the raceways 49 of the small tandem rollers 30 is pluggable connected to this flange 56. The covering element 57 has furthermore a circular outer circumference at its upper side 58.

According to the embodiment of the small tandem rollers 30, two apertures 59 are provided at the upper side 58, in which apertures 59 the small tandem rollers 30 with their raceways 49 project above the upper side 58 of the covering element 57. The raceways 49 project above the upper side 58 by approximately 2 mm to 12 mm, preferably 5 mm. Together with a center strip 60 separating the apertures 59, this covering element 57 causes the transmission element 47 to be covered and consequently reduces a possible risk of injury. In addition, the covering element 57 in conjunction with a not shown covering plate of the conveying module 15, according to the exemplary embodiment shown including three of the rows 11, it is achieved that the transfer conveying apparatus 1 is covered and abrasion residues, dust, dirt are thus prevented from accumulating in the transfer conveying apparatus 1.

A further possibility to fasten the covering element 57 onto the carrier for small rollers 34 is for example is given by attaching by means of springy brackets at the baring extensions 33 of the carrier for small rollers 34, where the small tandem rollers 30 are mounted in. The covering elements 57 are preferably manufactured as molded parts of plastics.

It is thus naturally ensured that the covering elements 57 having the circular external outline execute the pivoting movement together with the carrier for small rollers 34 and the previously mentioned covering plate has corresponding apertures, with the result that a relatively small gap is achieved between the covering element 57 and the corresponding apertures of the covering plate.

Figure 5:
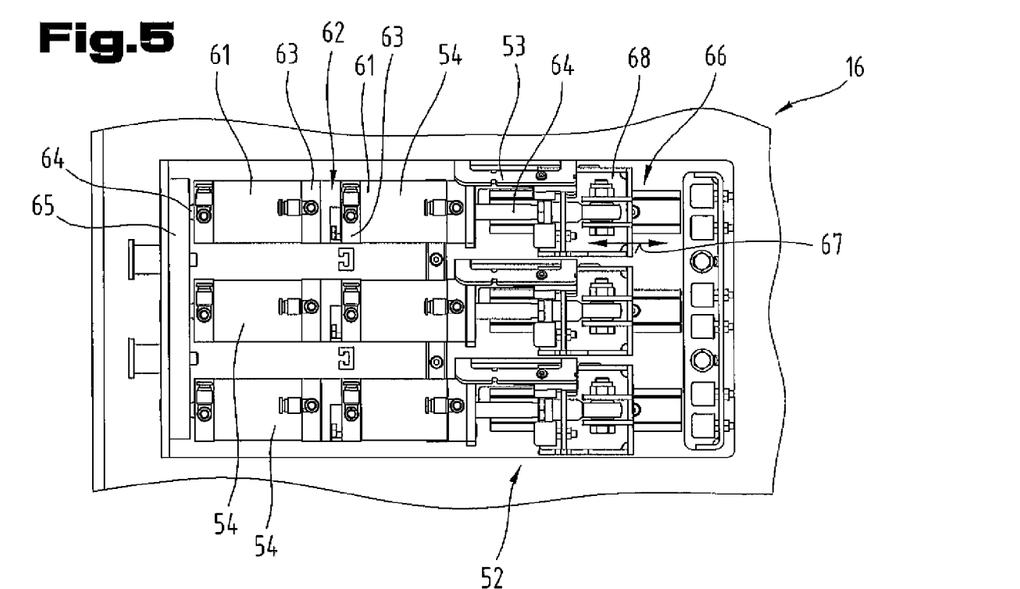
FIG. 5 shows a detail top view to the pivoting drive arrangement of the transfer conveying apparatus according to the invention.

FIG. 5 shows an example of the pivoting drive arrangement 52 disposed in the base module 16, with the pivoting drive arrangement 52 includes three linear adjustment drives 54, for example for three of the rows 11 of the small conveying rollers capable to pivot of the conveying module 15—as already described in FIG. 4. According to this exemplary embodiment, each row 11 of the small conveying rollers 14 is assigned to one linear adjustment drive 54 or adjustment drive and it is thus possible for these small conveying rollers 14 of each row 11 to be pivoted independently from each other.

The mechanical design of the three adjustment drives is identical and each of the adjustment drives includes two double-acting cylinders 61, which have the same structural shape and to which a pressure medium can be applied, which cylinders 61 are connected to one another at opposing end faces of cylinder bases 63 in alignment with the axis of the piston rods 64 to form an actuator 62.

One of the piston rods 64 is fastened to a support 65 arranged in the base module 16 in a fixed manner. The further piston rod 64 of the further cylinder 61 is fastened to a slide that comprises the drive member 53 for the drive-connection with the toothed belt 41 and that can be adjusted in a linear guide arrangement 66 according to double arrow 67.

The embodiment of the linear adjustment drive 54 comprising the two cylinders 61 allows the drive member 53 to have three positions when accordingly controlled, namely a center position, as shown on FIG. 5, where the piston rod 64 of a cylinder is extended, and on this basis, two end positions opposite each other, where the piston rods 64 of both cylinders 61 are extended or both piston rods 64 of the cylinders 61 are retracted.

It is nevertheless possible for the actuator 62 to be a servo-linear axis or an electrical spindle drive.

The desired pivot angle, by which the small conveying rollers 14 are to be capable to pivot about between the opposite end positions, is subject to the stroke of the cylinder 61 as well as the transmission ratio between stroke of the toothed belt and the average diameter of a tooth of the toothed ring 40 arranged at the carrier for small rollers 34.

The pivot angle is limited by the drive trains of the transmission means 47 for transmitting the drive torque to the small conveying rollers interlacing in their end positions, it is nevertheless possible due to the flexibility of the transmission means 47 for a complete pivot angle of nearly 180° to be achieved between the opposite end positions.

It should also be pointed out that one single actuator 62 is absolutely sufficient for a number of the rows 11 if it is possible for the small conveying rollers 14 of this row 11 to be collectively adjusted by an identical pivot angle each. In the event of such embodiments, several of the slides 68 equipped with the drive members 53 are movably connected and operated by an actuator 62.

Figure 6:
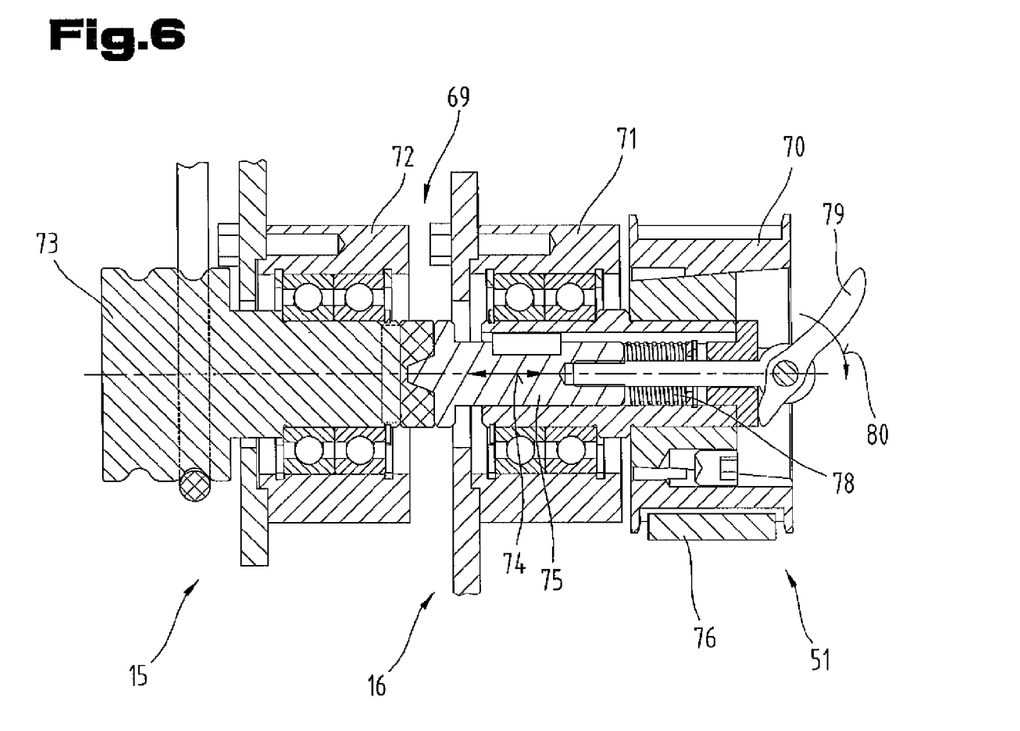
FIG. 6 shows a coupling of the small-roller drive arrangement of the transfer conveying apparatus according to the invention, in sectional view.
Figure 7:
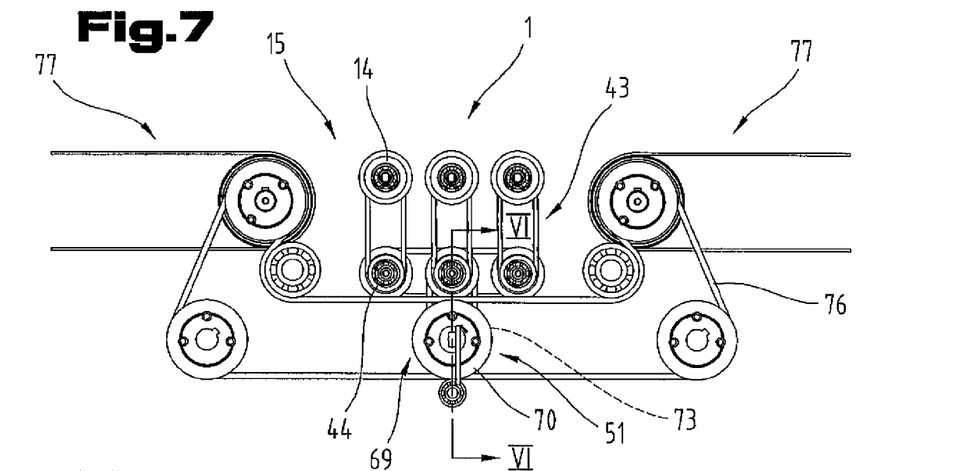
FIG. 7 shows a possible small-roller drive arrangement in simplified view.

FIGS. 6 and 7 show an embodiment for a detachable drive-connection between the small-roller drive arrangement 51 provided in the base module 16 and the drive transfer means 43 disposed in the conveying module 15 with a manually detachable, spring-loaded coupling 69 preferably having claw engagement for drive transmission.

This being the case, FIG. 6 shows the coupling 69 in engaging position, which is achieved when the conveying module 15 is fixed in its position at the base module 16 and a drive connection between a disc drive 70, which is mounted in a first coupling housing 71 arranged at the base module 16 to be able to rotate, and a transmission roller 73 of the drive transfer means 43, which is mounted to be able to rotate in a further coupling housing 72 fixed in the conveying module 15, by means of the coupling 69.

A coupling connection between the disc drive 70 and the transmission roller 73 is effected by means of a claw engagement at the end wall between the transmission roller 73 and a coupling pin 75 that can be adjusted in axial direction—according to double arrow 75—which coupling pin 75 is connected to the disc drive 70 to be able to rotate and in engaging position by means of a spring-preload via claw engagement at the end wall, cooperates with the transmission roller 73 being arranged in the coupling housing 72 to be able to rotate.

As it can be taken from the exemplary embodiment, e.g. the drive of the disc drive 70 is effected by means of a belt arrangement 76 with a circulating belt, originating from the belt conveyors 77 arranged and driven on both sides of the transfer conveying apparatus 1 (FIG. 7). In coupled mode of the coupling 69, the further drive-connection is effected via the transmission roller 73 with the drive transfer means 43 already described in the preceding Figures, the transmission means 47 of which drive transfer means 43 are the drive shaft 44 and the drive-connection of the drive shaft 44 to the small conveying rollers 14 in each row 11 of small conveying rollers 14.

A decoupling of the drive-connection is e.g. effected by adjusting the coupling pin 75 opposite the force, e.g. of a spiral compression spring 78 or a disc spring assembly by operating a cam lever 79 in the direction of an arrow 80, with the effect that the claw engagement at the end wall between the coupling pin 75 and the transmission roller 73 is detached and thus, the conveying module 15 can be removed from the base module 16.

It should at this point furthermore be mentioned that it is naturally possible for a coupling arrangement of the present kind to be also arranged between a not shown electric motor arranged at the base module 16 and the transmission roller 73 arranged at the conveying module 15 with the coupling being embodied in an adapted, constructive way in order to establish a detachable drive-connection between the base module 16 and the conveying module 15.

Figure 8:
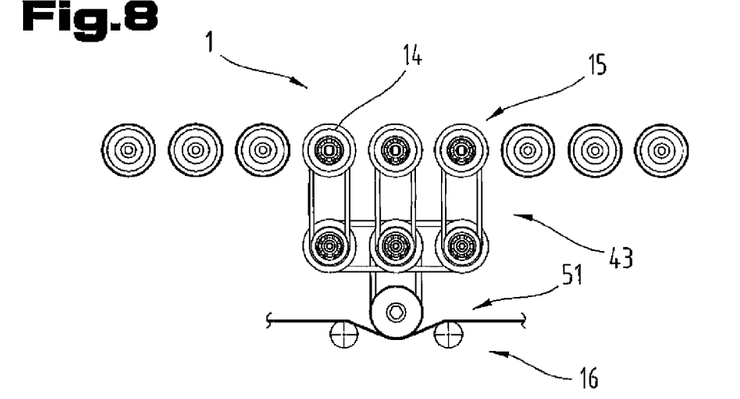
FIG. 8 shows another possible small-roller drive arrangement in simplified view.
Figure 9:
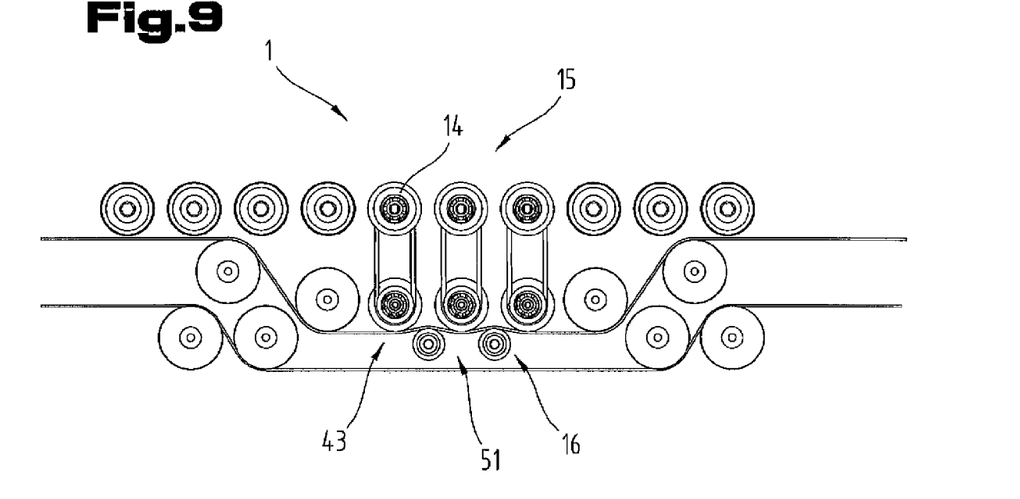
FIG. 9 shows a further possible small-roller drive arrangement in simplified view.
Figure 10:
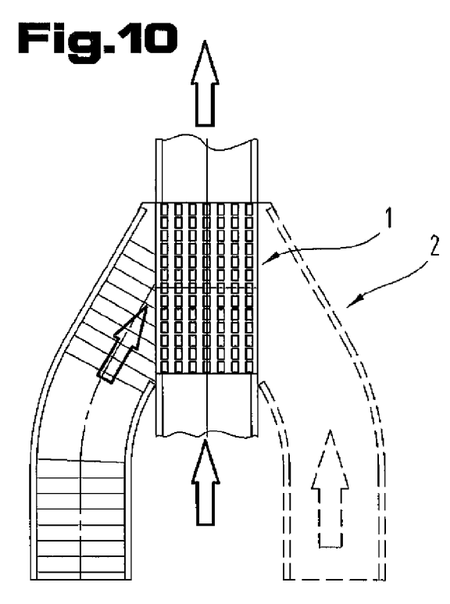
FIG. 10 to FIG. 17 show exemplary variants of possible processes of transfer during the operation of conveying systems having the transfer conveying apparatus according to the invention.
Figure 11:
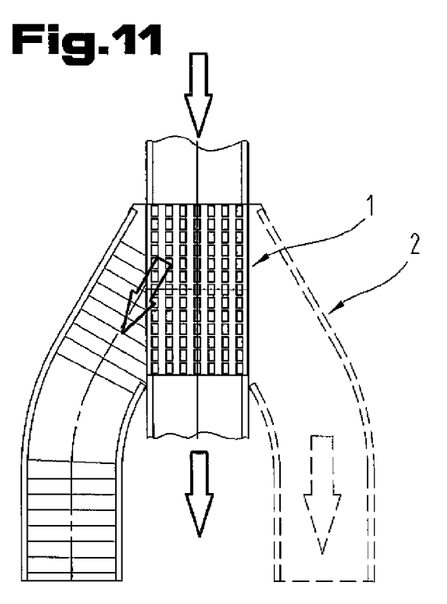
Figure 12:
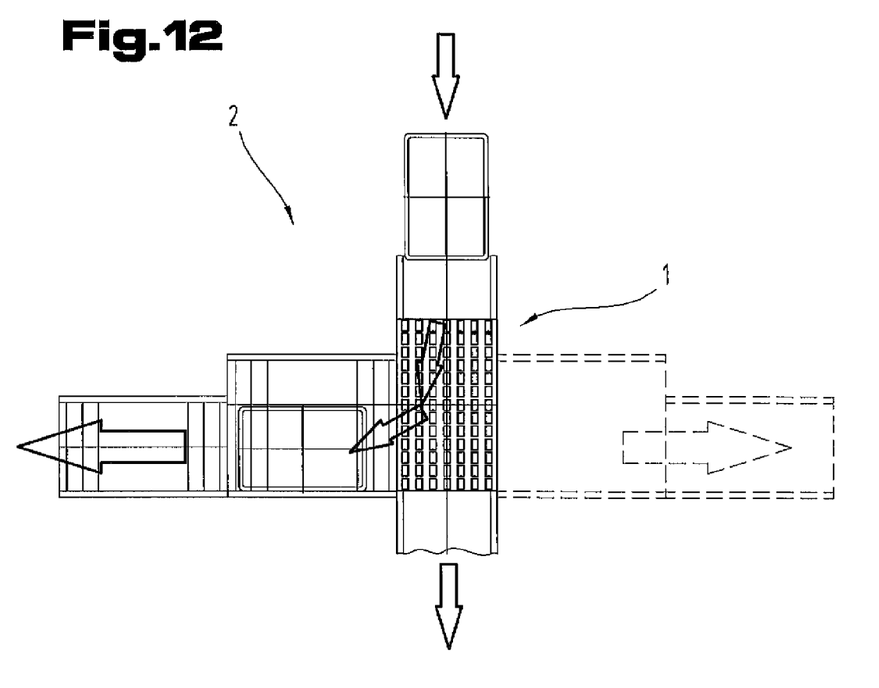
Figure 13:
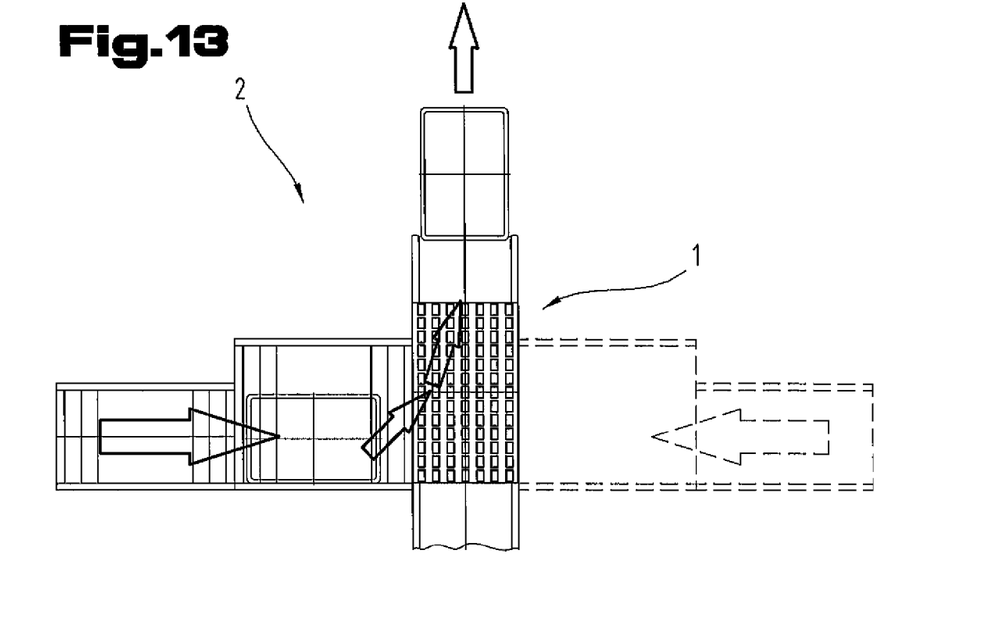
Figure 14:
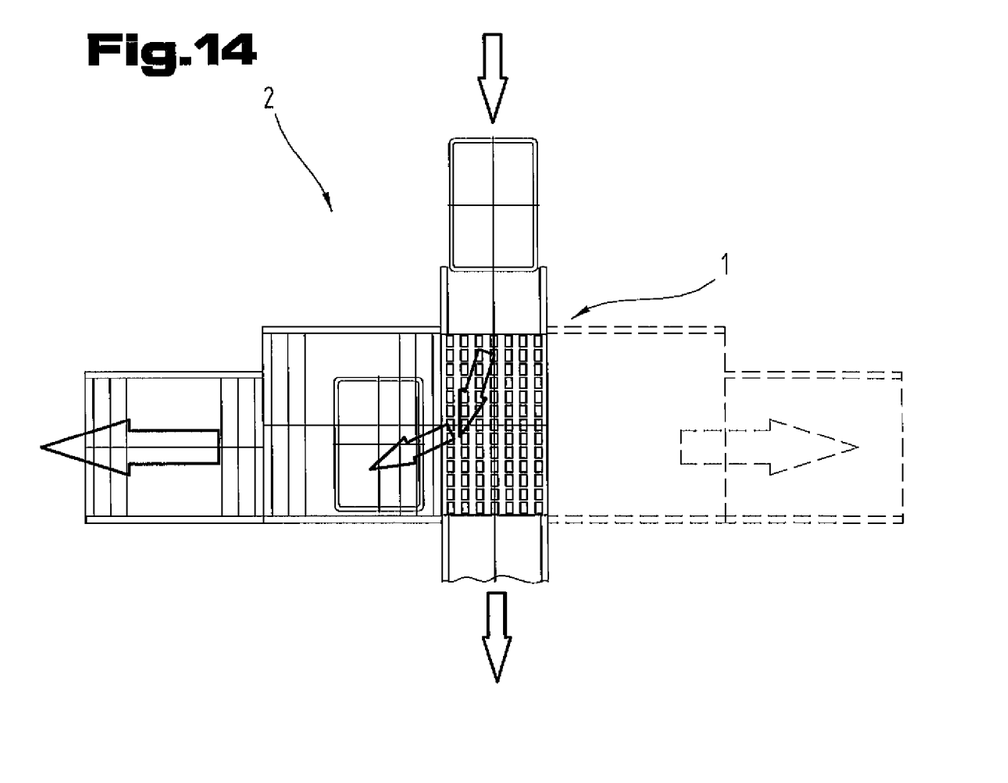
Figure 15:
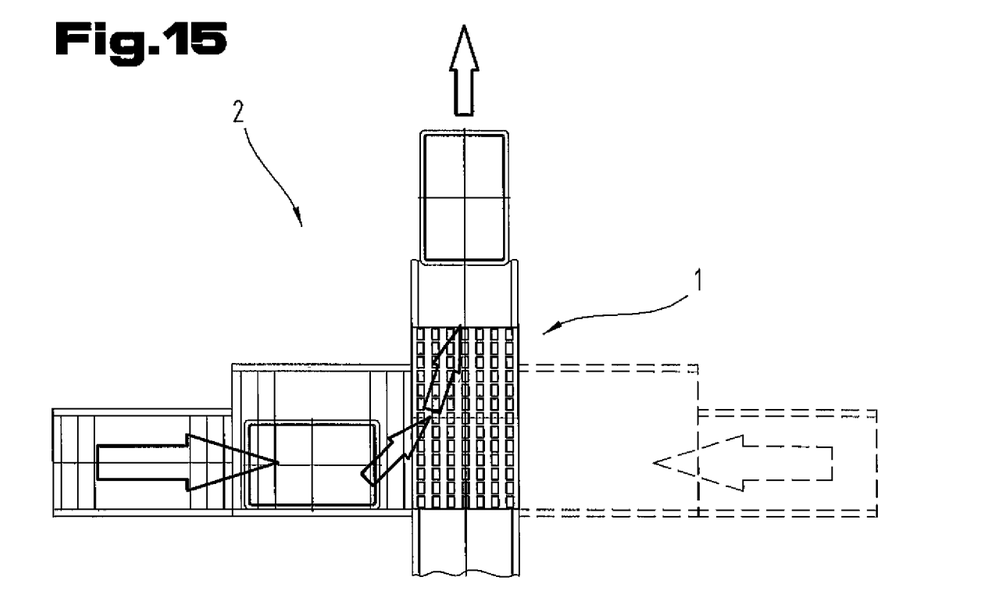
Figure 16:
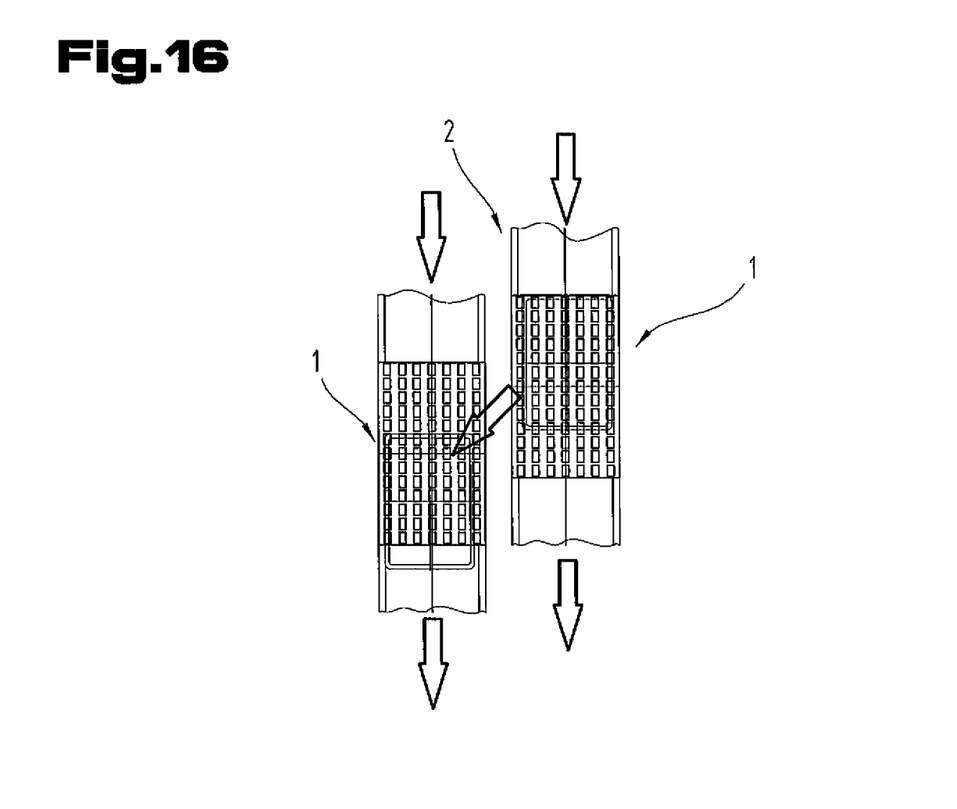
Figure 17:
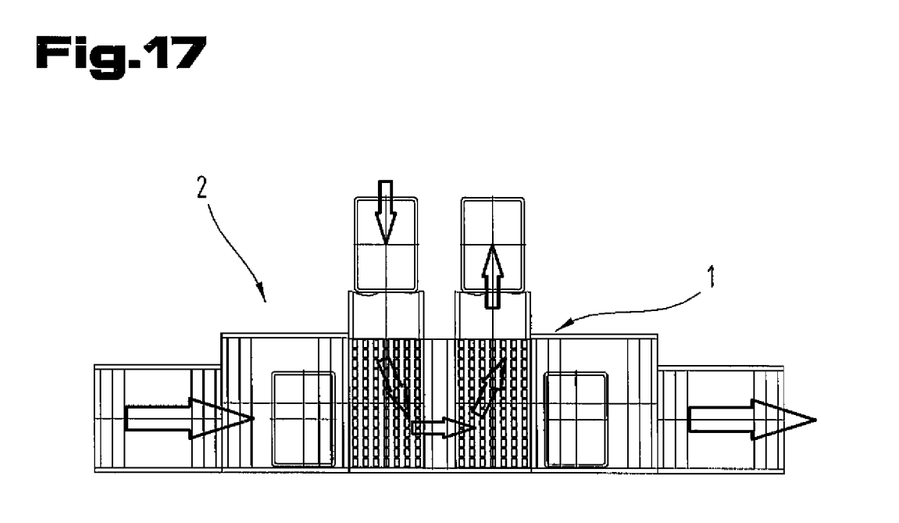

FIGS. 8 and 9 show further possible drive versions for a detachable drive-connection between the small-roller drive arrangement 51 arranged in the base module 16 and the drive transfer means 43 disposed in the conveying module 15 of the transfer conveying apparatus 1 according to the invention.

According to these solutions, existing drives in the conveying system are used in a very economical way for the small-roller drive of the transfer conveying apparatus 1 and the separation of the conveying module 15 from the base module 16 is achieved in simplest way.

Due to the modular design of the transfer conveying apparatus 1, variants that can be adapted to the transport requirements as well as to the respectively thereto designed conveying system 2 are allowed, as exemplarily shown in simplified illustration in FIGS. 10 to 17. It is possible for solutions for gating-in and gating-out at the most different angles up to nearly 90° on both sides to be achieved.

Furthermore, it is possible for gating-ins and gating-outs such as "longitudinal/longitudinal" as well as "longitudinal/transverse" to be realized as well as a "parallel dislocation" of the items of goods to be transported between the parallel conveying paths as well as a "parallel dislocation with reversion of conveying direction" and "conveying through a track of gating-in to a track of gating-out".

The embodiments illustrated as examples illustrate possible design variants of the transfer conveying apparatus 1, and it should be pointed out at this stage that the invention is not restricted to the various embodiments specifically illustrated and instead, various combinations of the individual embodiments with one another are possible, these possible variations being within the reach of the person skilled in this field based on the technical teaching outlined in the invention. Accordingly, all conceivable variations which can be obtained by combining individual details of the embodiments illustrated and described are possible and fail within the scope of the invention.

For the sake of good order, finally, it should be pointed out that, in order to provide a clearer understanding of the transfer conveying apparatus 1, it and its constituent parts are illustrated to a certain extent out of scale and/or on an enlarged scale and/or on a reduced scale.

List of Reference Numerals

1 Transfer conveying apparatus
2 Conveying system
3 Transported goods
4 Double arrow
5 Roller conveyor
6 Roller conveyor
7 Double arrow
8 Double arrow
9 Roller track gate
10 Roller track gate
11 Row
12 Conveying width
13 Conveying plane
14 Small conveying rollers
15 Conveying module -continued List of Reference Numerals

- 16 Base module
- 17 Lateral leg
- 18 Lateral leg
- 19 Load-bearing frame
- 20 Front plate
- 21 Front plate
- 22 Support bar
- 23 Positioning surface
- 24 Positioning surface
- 25 Positioning guide
- 26 Positioning guide
- 27 Fastening means
- 28 Fastening means
- 29 Medium distance
- 30 Small tandem rollers
- 31 Bore
- 32 Bearing bushing
- 33 Bearing extension
- 34 Carrier for small rollers
- 35 Pivot axis
- 36 Bearing pin
- 37 Bearing leg
- 38 Bearing leg
- 39 Rotary axis
- 40 Toothed ring
- 41 Toothed belt
- 42 Pivoting transfer means
- 43 Drive transfer means
- 44 Drive shaft
- 45 Rotary axis
- 46 Plane
- 47 Transmission means
- 48 Bore
- 49 Raceway
- 50 Groove
- 51 Small-roller drive arrangement
- 52 Pivoting drive arrangement
- 53 Drive member
- 54 Linear adjustment drive
- 55 Belt connector
- 56 Flange
- 57 Covering element
- 58 Upper side
- 59 Aperture
- 60 Center strip
- 61 Cylinder
- 62 Actuator
- 63 Cylinder base
- 64 Piston rod
- 65 Support
- 66 Guide system
- 67 Double arrow
- 68 Slide
- 69 Coupling
- 70 Disc drive
- 71 Coupling housing
- 72 Coupling housing
- 73 Transmission roller
- 74 Double Arrow
- 75 Coupling pin
- 76 Belt arrangement
- 77 Belt conveyor
- 78 Spiral compression spring
- 79 Cam lever
- 80 Arrow

The invention claimed is:

1. Transfer conveying apparatus (1) having a conveying module (15), a base module (16), small conveying rollers (14) which form a conveying plane (13) for an item of transported goods (3) in a main conveying direction or an auxiliary conveying direction, a pivoting drive arrangement (52) and a pivoting transfer means (42) for pivoting the small conveying rollers (14) about pivot axes (35) which extend perpendicularly with respect to the conveying plane (13) and with a small-roller drive arrangement (51) and a drive transfer means (43) for driving the small conveying rollers (14), with each small conveying roller (14) being mounted between bearing leg (37) of a carrier for small rollers (34) that can be pivoted about the pivot axis (35) and being able to be rotated around a rotary axis (39) that is aligned perpendicularly with respect to the pivot axis (35) and with the conveying module (15) being detachably connected to the base module (16), which base module (16) comprises the pivoting drive arrangement (52) and the small-roller drive arrangement (51), and the conveying module (15) forms a load-bearing frame (19), at least one row (11) of small conveying rollers (14) extending transversely with respect to the main conveying direction, the pivoting transfer means (42) for pivoting the small conveying rollers (14) in this row (11) and the drive transfer means (43) for driving the small conveying rollers (14) in this row (11), with the load-bearing frame (19) comprising front plates (20, 21) which are positioned between lateral legs (17, 18) of the base module (16) and detachably connected to the latter as well as a support bar (22) extending between the front plates (20, 21), wherein the support bar (22) is provided with bores (31) and therein arranged bearing bushings (32) each for accommodating a tube-shaped bearing extension (33) at the carrier for small rollers (34) in a pivotable way, with the bearing extension (33) of each of the carriers for small rollers (34) protruding over the bearing bushing (32) at the lower side of the support bar (22) and in its protruding end region being provided with a toothed ring (40), and wherein the toothed rings (40) in this row (11) are drive-connected to one another by means of a toothed belt (41) which is guided around the latter so that the pivoting transfer means (42) having the toothed rings (40) and the toothed belt (41) are arranged along the lower side of the support bar (22) and wherein the toothed belt (41) is coupled to a drive member (53) having the pivoting drive arrangement (52) by means of a belt connector.

2. Transfer conveying apparatus (1) according to claim 1, wherein the conveying module (15) has a number of rows (11) of small conveying rollers (14), which rows (11) are parallel, arranged at low distances to each other and extend across a conveying width (12).

3. Transfer conveying apparatus (1) according to claim 2, wherein the rows (11) are assigned to a common small-roller drive arrangement (51) that may be coupled to the drive transfer means (43) in the base module (16).

4. Transfer conveying apparatus (1) according to claim 2, wherein the rows (11) are assigned to a common pivoting drive arrangement (52) that may be coupled to the pivoting transfer means (42) in the base module (16).

5. Transfer conveying apparatus (1) according to claim 1, wherein the pivoting drive arrangement (52) is formed by a linear adjustment drive (54).

6. Transfer conveying apparatus (1) according to claim 5, wherein a transmission of an adjustment way between end positions of the linear adjustment drive (54) is designed for a pivot angle of the small conveying rollers (14) about the pivot axis to be approximately 180°.

7. Transfer conveying apparatus (1) according to claim 1, wherein at least one respective driven conveying roller is arranged between respectively adjacent rows (11) of small conveying rollers (14) extending across a conveying width (12).

8. Transfer conveying apparatus (1) according to claim 1, wherein the drive transfer means (43) comprises a drive shaft (44) which extends along the lower side of the support bar (22) between the front plates (20, 21) of the load-bearing frame (19) and is mounted to the front plates (20, 21).

9. Transfer conveying apparatus (1) according to claim 8, wherein the drive shaft (44) comprises annular constrictions which are assigned to the respective pivot axes (35) of the carrier for small rollers (35) and the small conveying rollers (14) are designed to be small tandem rollers (30) having two raceways (49) each and have an annularly designed groove (50) between the raceways (49), with the small tandem rollers (30) being coupled to the drive shaft (44) by means of endless string-like transmission means (47) respectively running in the grooves (50) and the constrictions.

10. Transfer conveying apparatus (1) according to claim 8, wherein the conveying module (15) comprises a transmission roller (73) and the drive transfer means (43) comprises the drive shaft (44), with the transmission roller (73) being mounted in a rotatable way in a coupling housing (72) arranged at the conveying module (15) and coupled to the drive shaft (44) by means of a circulating belt, and the base module (16) comprises the small-roller drive arrangement (51) and a disc drive (70), with the disc drive (70) being mounted in a rotatable way in a coupling housing (71) arranged at the base module (16), and wherein the transmission roller (73) is detachably drive-connected to a disc drive (70) via a mechanical coupling (69).

11. Transfer conveying apparatus (1) according to claim 10, wherein the disc drive (70) is drive-connected to a coupling pin (75) being mounted in the coupling housing (71) so as to be adjustable in axial direction.

12. Transfer conveying apparatus (1) according to claim 11, wherein the coupling pin (75) and the transmission roller (73) can preferably be coupled via a claw coupling on the end wall side.

13. Transfer conveying apparatus (1) according to claim 12, wherein the coupling pin (75) is pre-stressed by means of a spring arrangement in engaged position of the claw coupling.

14. Transfer conveying apparatus (1) according to claim 8, wherein the conveying module (15) comprises a transmission roller (73), with the transmission roller (73) being mounted in a rotatable way in a coupling housing (72) arranged at a conveying module (15) and coupled to the drive shaft (44) by means of a circulating belt, and the base module (16) comprises an electric motor, with the transmission roller (73) being detachably drive-connected to the electric motor by means of a mechanical coupling.

15. Transfer conveying apparatus (1) according to claim 1, wherein the small conveying roller (14) is designed to be a small tandem roller (30) having an annularly designed groove between the raceways (49) and wherein a covering element (57) is arranged at the carrier for small rollers (34), which covering element (57) is provided with apertures (59) for a protrusion of a portion of the raceways (49) of the small tandem rollers (30).

16. Conveying system for transporting items of transported goods (3) with a transfer conveying apparatus (1), a driven conveyor (77) being arranged ahead the latter and a driven belt conveyor (77) being arranged subsequent to the latter, wherein the transfer conveying apparatus (1) is embodied according to claim 10, with the disc drive (70) being drive-connected to driven conveyors (77), e.g. belt conveyors, roller conveyors arranged ahead and subsequently by means of a belt arrangement (76).

\* \* \* \* \*